(12) United States Patent
Roberts et al.

(10) Patent No.: US 9,918,043 B2
(45) Date of Patent: Mar. 13, 2018

(54) SNIPPET ACCESS SYSTEMS AND METHODS

(75) Inventors: Brian Roberts, Frisco, TX (US); Heath Stallings, Grapevine, TX (US); Don Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1774 days.

(21) Appl. No.: 11/474,991

(22) Filed: Jun. 27, 2006

(65) Prior Publication Data

US 2007/0300269 A1    Dec. 27, 2007

(51) Int. Cl.
| | |
|---|---|
| H04N 7/173 | (2011.01) |
| H04N 21/258 | (2011.01) |
| H04N 21/2668 | (2011.01) |
| H04N 21/472 | (2011.01) |
| H04N 21/61 | (2011.01) |
| H04N 21/658 | (2011.01) |
| H04N 21/81 | (2011.01) |

(52) U.S. Cl.
CPC ... H04N 7/17318 (2013.01); H04N 21/25891 (2013.01); H04N 21/2668 (2013.01); H04N 21/47202 (2013.01); H04N 21/6125 (2013.01); H04N 21/6581 (2013.01); H04N 21/812 (2013.01)

(58) Field of Classification Search
CPC ......... H04N 21/25891; H04N 21/2668; H04N 21/47202; H04N 21/6125; H04N 21/6581; H04N 21/812; H04N 7/17318
USPC .............................................. 725/32, 36, 38
See application file for complete search history.

(56) References Cited

U.S. PATENT DOCUMENTS

| | | |
|---|---|---|
| 4,977,455 A | 12/1990 | Young |
| 5,151,789 A | 9/1992 | Young |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,479,266 A | 12/1995 | Young et al. |
| 5,479,268 A | 12/1995 | Young et al. |
| 5,499,103 A | 3/1996 | Mankovitz |
| 5,512,963 A | 4/1996 | Mankovitz |
| 5,515,173 A | 5/1996 | Mankovitz et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,600,711 A | 2/1997 | Yuen |
| 5,619,274 A | 4/1997 | Roop et al. |
| 5,640,484 A | 6/1997 | Mankovitz |
| 5,684,525 A | 11/1997 | Klosterman |

(Continued)

*Primary Examiner* — Nathan Flynn
*Assistant Examiner* — Christine Kurien

(57) ABSTRACT

In one of many possible embodiments, a system includes a requesting media content processing subsystem and a network entity. The requesting media content processing subsystem is configured to transmit to the network entity a request to access a snippet of a media content instance. The network entity is configured to augment the snippet with additional media content and provide a user with access to the augmented snippet via the requesting media content processing subsystem.

29 Claims, 16 Drawing Sheets

(56) References Cited

U.S. PATENT DOCUMENTS

| | | |
|---|---|---|
| 5,701,383 A | 12/1997 | Russo et al. |
| 5,706,145 A | 1/1998 | Hindman et al. |
| 5,727,060 A | 3/1998 | Young |
| 5,734,786 A | 3/1998 | Mankovitz |
| 5,790,198 A | 8/1998 | Roop et al. |
| 5,801,787 A | 9/1998 | Schein et al. |
| 5,808,608 A | 9/1998 | Young et al. |
| 5,809,204 A | 9/1998 | Young et al. |
| 5,812,205 A | 9/1998 | Milnes et al. |
| 5,828,945 A | 10/1998 | Klosterman |
| 5,870,150 A | 2/1999 | Yuen |
| 5,886,746 A | 3/1999 | Yuen et al. |
| 5,915,026 A | 6/1999 | Mankovitz |
| 5,923,362 A | 7/1999 | Klosterman |
| 5,940,073 A | 8/1999 | Klosterman et al. |
| 5,949,954 A | 9/1999 | Young et al. |
| 5,959,688 A | 9/1999 | Schein et al. |
| 5,969,748 A | 10/1999 | Casement et al. |
| 5,970,206 A | 10/1999 | Yuen et al. |
| 5,974,222 A | 10/1999 | Yuen et al. |
| 5,987,213 A | 11/1999 | Mankovitz et al. |
| 5,988,078 A | 11/1999 | Levine |
| 5,991,498 A | 11/1999 | Young |
| 6,002,394 A | 12/1999 | Schein et al. |
| 6,016,141 A | 1/2000 | Knudson et al. |
| 6,028,599 A | 2/2000 | Yuen et al. |
| 6,049,652 A | 4/2000 | Yuen et al. |
| 6,052,145 A | 4/2000 | Macrae et al. |
| 6,061,056 A * | 5/2000 | Menard et al. ............... 715/704 |
| 6,072,983 A | 6/2000 | Klosterman |
| 6,075,551 A | 6/2000 | Berezowski et al. |
| 6,075,575 A | 6/2000 | Schein et al. |
| 6,078,348 A | 6/2000 | Klosterman et al. |
| 6,091,882 A | 7/2000 | Yuen et al. |
| 6,118,492 A | 9/2000 | Milnes et al. |
| 6,133,909 A | 10/2000 | Schein et al. |
| 6,137,950 A | 10/2000 | Yuen |
| 6,144,401 A | 11/2000 | Casement et al. |
| 6,151,059 A | 11/2000 | Schein et al. |
| 6,167,188 A | 12/2000 | Young et al. |
| 6,177,931 B1 | 1/2001 | Alexander et al. |
| 6,216,265 B1 | 4/2001 | Roop et al. |
| 6,239,794 B1 | 5/2001 | Yuen et al. |
| 6,247,176 B1 | 6/2001 | Schein et al. |
| 6,262,722 B1 | 7/2001 | Allison et al. |
| 6,263,501 B1 | 7/2001 | Schein et al. |
| 6,323,911 B1 | 11/2001 | Schein et al. |
| 6,341,195 B1 | 1/2002 | Mankovitz et al. |
| 6,341,374 B2 | 1/2002 | Schein et al. |
| 6,388,714 B1 | 5/2002 | Schein et al. |
| 6,396,546 B1 | 5/2002 | Alten et al. |
| 6,412,110 B1 | 6/2002 | Schein et al. |
| 6,430,358 B1 | 8/2002 | Yuen et al. |
| 6,430,359 B1 | 8/2002 | Yuen et al. |
| 6,453,471 B1 | 9/2002 | Klosterman |
| 6,460,181 B1 | 10/2002 | Donnelly |
| 6,466,734 B2 | 10/2002 | Yuen et al. |
| 6,469,753 B1 | 10/2002 | Klosterman et al. |
| 6,477,705 B1 | 11/2002 | Yuen et al. |
| 6,498,895 B2 | 12/2002 | Young et al. |
| 6,505,348 B1 | 1/2003 | Knowles et al. |
| 6,538,701 B1 | 3/2003 | Yuen |
| 6,549,719 B2 | 4/2003 | Mankovitz |
| 6,564,379 B1 | 5/2003 | Knudson et al. |
| 6,567,606 B2 | 5/2003 | Milnes et al. |
| 6,588,013 B1 | 7/2003 | Lumley et al. |
| 6,668,133 B2 | 12/2003 | Yuen et al. |
| 6,687,906 B1 | 2/2004 | Yuen et al. |
| 6,732,369 B1 | 5/2004 | Schein et al. |
| 6,742,183 B1 | 5/2004 | Reynolds et al. |
| 6,745,391 B1 | 6/2004 | Macrae et al. |
| 6,756,997 B1 | 6/2004 | Ward et al. |
| 6,760,537 B2 | 7/2004 | Mankovitz |
| 6,799,326 B2 | 9/2004 | Boylan et al. |
| 6,799,327 B1 | 9/2004 | Reynolds et al. |
| 6,850,693 B2 | 2/2005 | Young et al. |
| 6,859,799 B1 | 2/2005 | Yuen |
| 7,039,935 B2 | 5/2006 | Knudson et al. |
| 7,069,576 B1 | 6/2006 | Knudson et al. |
| 7,487,529 B1 | 2/2009 | Orlick |
| 7,735,101 B2 * | 6/2010 | Lanza et al. .................... 725/32 |
| 2001/0029610 A1 | 10/2001 | Corvin et al. |
| 2001/0047298 A1 | 11/2001 | Moore et al. |
| 2001/0054181 A1 | 12/2001 | Corvin |
| 2002/0073424 A1 | 6/2002 | Ward et al. |
| 2002/0124255 A1 | 9/2002 | Reichardt et al. |
| 2003/0005445 A1 | 1/2003 | Schein et al. |
| 2003/0056219 A1 | 3/2003 | Reichardt et al. |
| 2003/0093790 A1 * | 5/2003 | Logan et al. .................... 725/38 |
| 2003/0110495 A1 | 6/2003 | Bennington et al. |
| 2003/0110499 A1 | 6/2003 | Knudson et al. |
| 2003/0115599 A1 | 6/2003 | Bennington et al. |
| 2003/0115602 A1 | 6/2003 | Knee et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0204847 A1 | 10/2003 | Ellis et al. |
| 2003/0208756 A1 | 11/2003 | Macrae et al. |
| 2004/0010806 A1 | 1/2004 | Yuen et al. |
| 2004/0019901 A1 | 1/2004 | Spio |
| 2004/0045025 A1 | 3/2004 | Ward et al. |
| 2004/0107437 A1 | 6/2004 | Reichardt et al. |
| 2004/0168189 A1 | 8/2004 | Reynolds et al. |
| 2004/0194138 A1 | 9/2004 | Boylan et al. |
| 2004/0261098 A1 | 12/2004 | Macrae et al. |
| 2005/0010949 A1 | 1/2005 | Ward et al. |
| 2005/0028201 A1 | 2/2005 | Klosterman et al. |
| 2005/0125823 A1 | 6/2005 | McCoy et al. |
| 2005/0149964 A1 | 7/2005 | Thomas et al. |
| 2005/0155056 A1 | 7/2005 | Knee et al. |
| 2005/0216936 A1 | 9/2005 | Knudson et al. |
| 2005/0251824 A1 | 11/2005 | Thomas et al. |
| 2005/0283810 A1 * | 12/2005 | Ellis et al. .................... 725/93 |
| 2006/0047952 A1 | 3/2006 | Van Den Heuvel et al. |
| 2006/0156336 A1 | 7/2006 | Knudson et al. |
| 2006/0212894 A1 | 9/2006 | Knudson et al. |
| 2006/0277574 A1 | 12/2006 | Schein et al. |
| 2006/0288366 A1 | 12/2006 | Boylan et al. |
| 2007/0016926 A1 | 1/2007 | Ward et al. |
| 2007/0033613 A1 | 2/2007 | Ward et al. |
| 2007/0107010 A1 | 5/2007 | Jolna et al. |
| 2007/0192792 A1 * | 8/2007 | Nagamatsu .................... 725/39 |

\* cited by examiner

SNIPPETS

| | My Snippets | Received Snippets | | |
|---|---|---|---|---|
| TITLE | DATE RECORDED | LENGTH | OPTIONS | |
| COPS | Tues, 8/23 | 1 min. 27 sec. | View Share | Del. |
| Sienfeld | Mon, 8/22 | 2 min. 21 sec. | View Share | Del. |
| American Idol | Sun, 8/21 | 45 sec. | View Share | Del. |
| Lost | Sun, 8/21 | 2 min. 57 sec. | View Share | Del. |
| 60 Minutes | Sun, 8/21 | 1 min. 54 sec. | View Share | Del. |

Fig. 13

SNIPPETS

| | My Snippets | Received Snippets | | | |
|---|---|---|---|---|---|
| TITLE | DATE RECEIVED | LENGTH | FROM | OPTIONS | |
| House | Tues, 8/23 | 1 min. 15 sec. | Tom | View Record | Del. |
| E.R. | Mon, 8/22 | 2 min. 11 sec. | Joe | View Record | Del. |
| Local News | Sun, 8/21 | 34 sec. | Karen | View Record | Del. |
| Survivor | Thurs, 8/18 | 2 min. 59 sec. | Bill | View Record | Del. |
| Deal or No Deal | Wed, 8/17 | 1 min. 31 sec. | Jason | View Record | Del. |

Fig. 14

SNIPPET ACCESS SYSTEMS AND METHODS

BACKGROUND INFORMATION

The advent of computers, interactive electronic communication, the Internet, and other advances in the digital realm of consumer electronics have resulted in a great variety of programming, recording, and viewing options for users who view media content such as television programs. In implementing such options, the set-top box ("STB") has become an important computing device for accessing media content services and the media content within those services. In addition to supporting traditional analog broadcast video functionality, STBs also support an increasing number of two-way digital services such as video-on-demand and personal video recording.

An STB is typically connected to a cable or satellite, or generally, a subscriber television system, and includes hardware and software necessary to provide the functionality of the subscriber television system. Conventional STBs include a processor, communication components, and memory and are connected to a television or other display device, such as a personal computer. While many STBs are stand-alone devices that are externally connected to a television, an STB and/or its functionality may be integrated into a television or personal computer or even into an audio device such as a programmable radio, as is well known.

An STB is usually configured to provide users with a large number and variety of media content choices. For example, a user may choose to view or otherwise access a variety of television programs, pay-per-view services, video-on-demand programming, Internet services, and audio programming via an STB.

As mentioned, an STB may also include a personal video recording ("PVR") application that allows a user to temporarily and/or permanently record selected media content to a storage device. Such recording functionality enables a user to view media content in "trick play," or non-linear, modes. Trick play modes include, but are not limited to, slow motion, fast motion, reverse play, fast forward play, instant replay, jumping, pausing of live broadcast, and scanning. To facilitate trick play modes, the media content is buffered or stored in a temporary memory buffer, often called a live cache buffer, so that it may be replayed non-linearly.

The ability to buffer live broadcasts has had a significant impact on the broadcast television industry. In the past, the basic business model for broadcast television programming has been free or low cost distribution of media content, subsidized by the insertion of commercials. Commercials also allow media content providers to promote and provide exposure to new television programs and other instances of media content.

However, PVRs allow users to easily skip many of these commercials. As a result, traditional advertisements and promotions for new television programs and other instances of media content are being rendered less and less effective as the number of PVR users increases. Media content providers have therefore been forced to turn to other methods of promoting new instances of media content.

One effective method of promoting new instances of media content is through "word of mouth" among media content consumers. For example, the Internet has spawned social networking websites and chat rooms wherein users often discuss broadcast television programming and other instances of media content. Users often rely on the recommendations of others to discover new instances of media content for viewing. Moreover, because of the recording capabilities of PVRs, some users may even record and then distribute to other users through peer-to-peer networks entire episodes of a particular television program, for example.

The recording and distribution of entire episodes of media content instances is a major concern among media content providers because it may significantly reduce their revenue through advertising, broadcast rights, and syndication. Moreover, it is currently extremely difficult for media content providers to monitor and/or control such distribution, and the expansion of broadcast media content to the Internet and to peer-to-peer file sharing networks has continued. The sharing of media content among consumers, when properly controlled by media content providers, has the potential to spread awareness of programming virally and to increase the number of consumers viewing particular media content instances. However, recording and distribution tools that provide individual viewers with the ability to evangelize their favorite programming with others while at the same time allowing media content providers to control and profit by the shared distribution of media content do not exist.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

FIG. 13 illustrates an exemplary GUI that may be displayed to provide a user with access to a number of recorded snippets, according to an embodiment.

FIG. 14 shows an exemplary GUI that may be configured to display a user with access to one or more snippets that have been received from another user, according to an embodiment.

DETAILED DESCRIPTION OF PREFERRED EMBODIMENTS

I. Introduction

Figure 1:
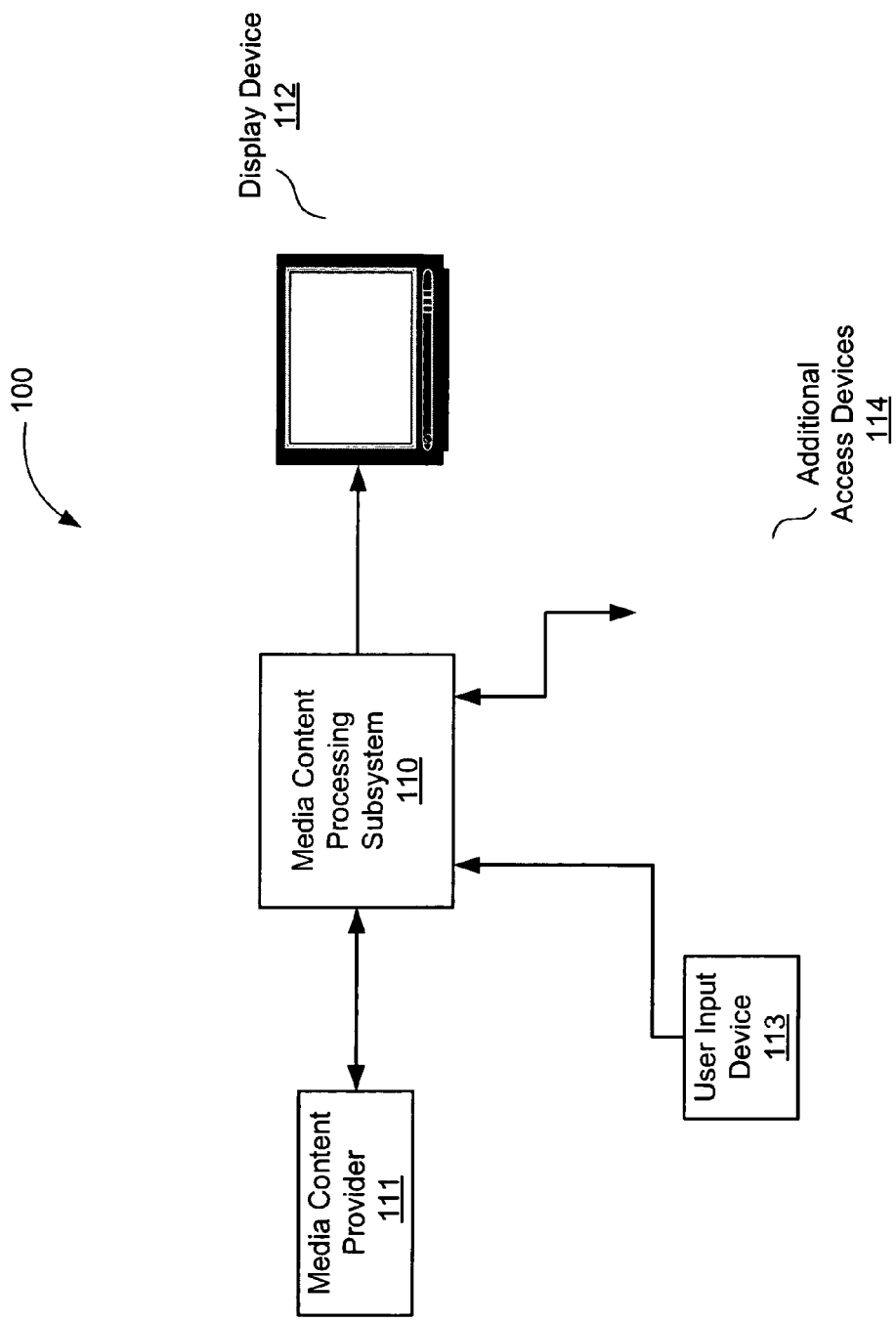
FIG. 1 illustrates an example of a media content access system, according to an embodiment.

Preferred exemplary systems and methods for providing a user with the ability to record, share, or otherwise access a snippet of a media content instance are described herein. As used herein, the term "media content instance" will be used to refer generally to any television program, on-demand program, pay-per-view program, broadcast media program, commercial, advertisement, video, movie, song, photograph, or any segment or combination of these or other forms of media content that may be experienced or viewed by a user. The term "snippet", as used herein, refers to any portion or number of frames of a media content instance. For example, a snippet may include as little as a single frame of a media content instance, or it may include up to and including approximately the entire length of the media content instance. As used herein, the term "accessing a snippet" means viewing, sharing, transmitting, presenting (e.g., displaying), copying, or otherwise processing a snippet.

In certain embodiments, a media content processing subsystem, such as a set-top box (STB), is configured to communicate with a network entity, such as a media content provider server. A user may transmit to the processing subsystem a request to access a snippet that has been recorded by the processing subsystem or by some other recording device. The processing subsystem may then relay the request to the network entity, which processes the request and augments the snippet with additional media content. The additional content may include, but is not limited to, one or more advertisements, commercials, promotions, screen shots, credits, and/or any other instance of media content as may serve a particular application. The user may then access the augmented snippet via one or more graphical user interfaces provided by the processing subsystem.

As used herein, the term "requesting media content processing subsystem" will be used to refer to a media content processing subsystem that transmits to a network entity a request to access a snippet that has been recorded. The term "recording media content processing subsystem" will be used to refer to a media content processing subsystem that records a snippet of a media content instance and/or shares a snippet of a media content instance with another media content processing subsystem. It will be recognized that in some examples a particular media content processing subsystem may be configured to serve as both a requesting and a recording media content processing subsystem.

The systems and methods described herein may be used to provide media content consumers with the ability to easily record, share, and otherwise access snippets of favorite instances of media content. The sharing of media content snippets among users may serve to virally spread awareness of a particular media content instance and may result in an increased number of viewers for a particular media content instance. Moreover, the systems and methods described herein may facilitate more effective advertising and may be used to increase revenue for media content providers by allowing advertisers to include advertisements and/or other additional content within an enhanced snippet that is viewed or otherwise accessed by a user.

Components and functions of exemplary embodiments of media content access systems and methods will now be described in more detail.

II. Exemplary System View

FIG. 1 illustrates an example of a media content access system 100, according to one embodiment. Media content access system may take many different forms and include multiple and/or alternate components and facilities. Examples of such multiple/alternate components and facilities are reflected in commonly-assigned patent applications entitled "Enhanced Content Access Systems and Methods" to Roberts, et al. Ser. No. 11/474,995, now U.S. Pat. No. 9,635,435, and entitled "Media Content Access Systems and Methods" to Roberts, et al. Ser. No. 11/474,992, now U.S. Pat. No. 9,173,001, each of which being filed on the same day as the present application, and each of which incorporated herein by reference in their respective entireties.

As shown in FIG. 1, a media content processing subsystem 110 is configured to communicate with and receive a data stream (i.e., a media content stream) containing a media content instance from a media content provider 111. The media content processing subsystem 110 and media content provider 111 may communicate using any known communication technologies, devices, media, and protocols supportive of remote data communications, including, but not limited to, cable networks, subscriber television networks, satellite networks, the Internet, intranets, local area networks, wireless networks (e.g., mobile telephone networks), optical fiber networks, data transmission media, communications devices, Transmission Control Protocol ("TCP"), Internet Protocol ("IP"), File Transfer Protocol ("FTP"), telnet, Hypertext Transfer Protocol ("HTTP"), socket connections, Ethernet, and other suitable communications networks and technologies.

The media content processing subsystem 110 is configured to process the media content stream provided by the media content provider 111 and provide a signal to a display device 112 so that the display device 112 may display the media content. As will be described in more detail below, the media content processing subsystem 110 may be controlled by a user input device 113 and/or one or more additional access devices 114.

While an exemplary media content access system 100 is shown in FIG. 1, the exemplary components illustrated in FIG. 1 are not intended to be limiting. Indeed, additional or alternative components and/or implementations may be used, as is well known. Each of the components of system 100 will now be described in additional detail.

A. Media Content Provider

Media content provider 111 is configured to provide various types of media content via a satellite, cable system, subscriber television network, the Internet, optical fiber network, wireless network, or any other suitable network. The media content may include, but is not limited to, television programs, pay-per-view services, video-on-demand programming, Internet services, DVD content, and audio programming.

Figure 2:
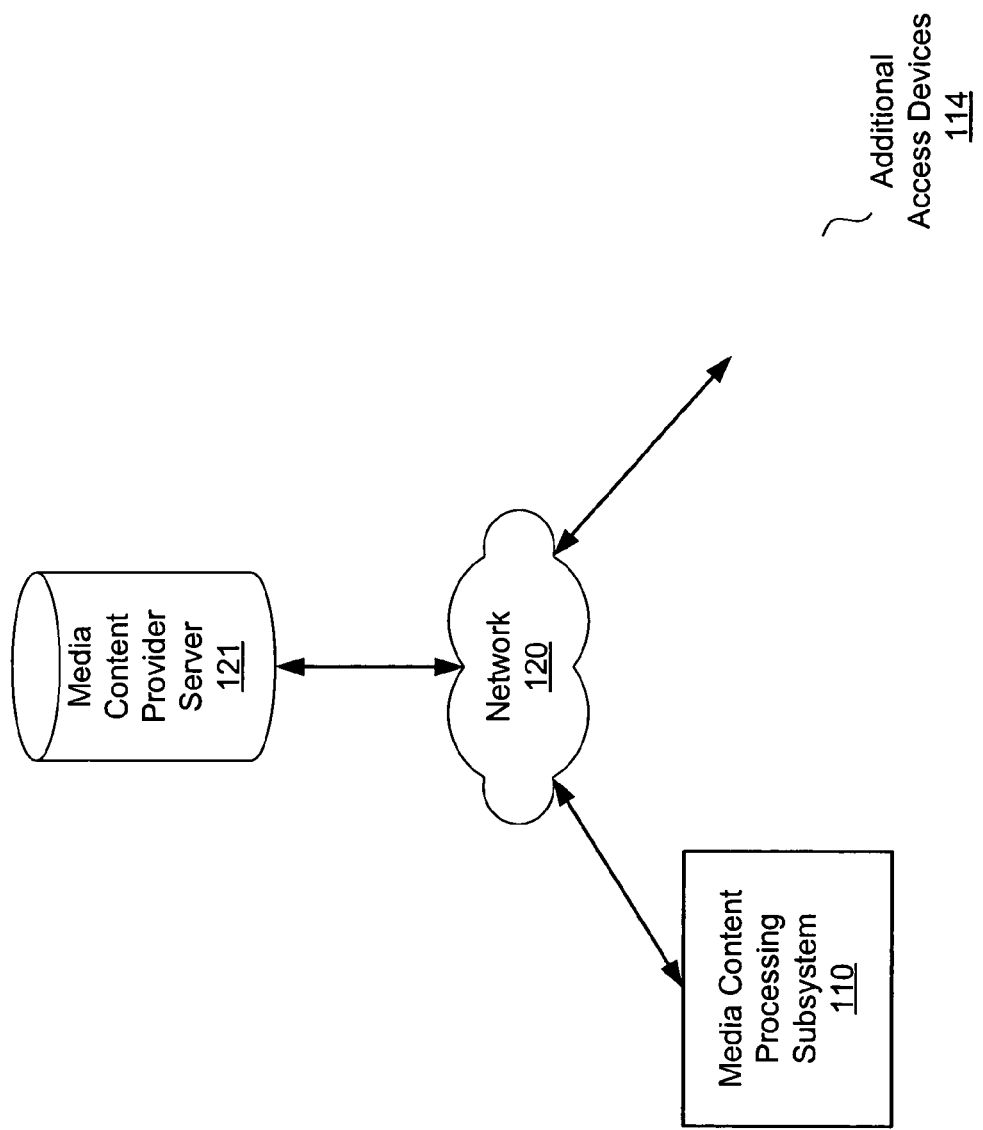
FIG. 2 is an illustration of an exemplary media content provider network, according to an embodiment.

An exemplary media content provider 111 includes a media content provider server 121, as shown in FIG. 2. FIG. 2 is an illustration of an exemplary media content provider network. As shown in FIG. 2, the media content provider server 121, media content processing subsystem 110, one or more of the additional access devices 114, and/or any other network entity may be configured to communicate one with another via one or more types of networks 120 and communication links thereto. The network 120 shown in FIG. FIG. 2 may include the Internet, an intranet or other private packet-switched network, a cable television network (e.g., hybrid fiber-coax network), a wireless broadcast network (e.g., a satellite media broadcasting network or terrestrial broadcasting network), a telephone network, a provider-specific network (e.g., a Verizon® FIOS® network and/or a TiVo® network), an optical fiber network, or any other suitable network. In some alternative examples, the processing subsystem 110 and/or one or more of the additional access devices 114 may be connected directly to the media content provider server 121.

B. Display Device

As mentioned, the processing subsystem 110 may be coupled to a display device 112 that is configured to display or play the media content. The display device 112 may include, but is not limited to, a television, computer monitor, handheld device, or any other device configured to display or play the media content.

C. Media Content Processing Subsystem

Figure 3:
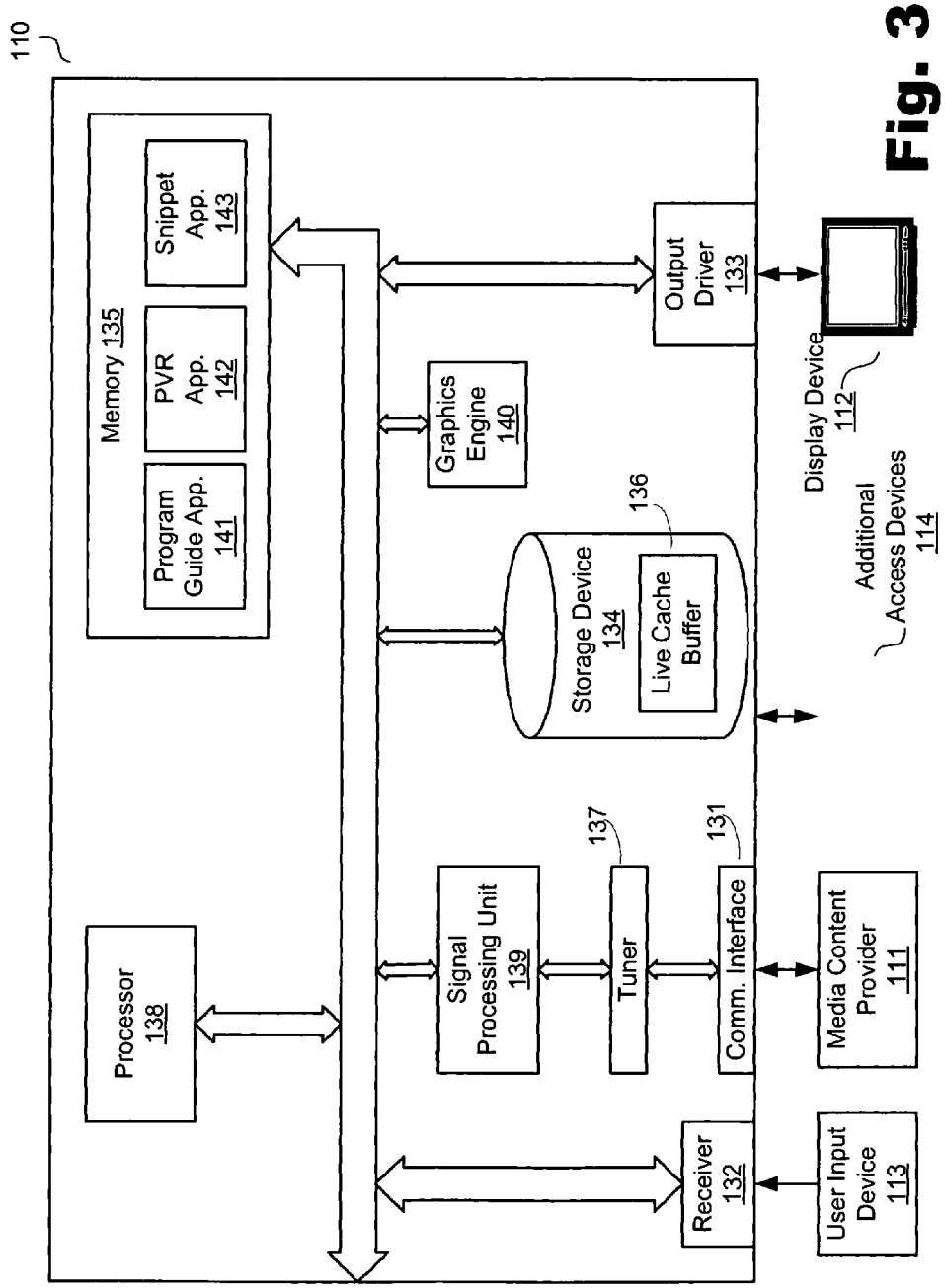
FIG. 3 is a block diagram of an exemplary media content processing subsystem, according to an embodiment.

FIG. 3 is a block diagram of an exemplary media content processing subsystem 110 (or simply "processing subsystem 110") according to an exemplary embodiment. The processing subsystem 110 may include any combination of hardware, software, and firmware configured to process an incoming media content stream. As used herein and in the appended claims, unless otherwise specifically denoted, the terms "media content processing subsystem" and "processing subsystem" will be used to refer expansively to all possible user terminals and/or receivers that are configured to process digital and/or analog media content. Hence, an exemplary processing subsystem 110 may include, but is not limited to, a set-top box, home communication terminal ("HCT"), digital home communication terminal ("DHCT"), stand-alone personal video recorder ("PVR"), digital video disc ("DVD") player, video-enabled phone, personal computer, and/or any other access device.

In certain embodiments, the processing subsystem 110 may include any computer hardware and/or instructions (e.g., software programs), or combinations of software and hardware, configured to perform the processes described herein. In particular, it should be understood that processing subsystem 110 may be implemented on one physical computing device or may be implemented on more than one physical computing device. Accordingly, processing subsystem 110 may include any one of a number of well known computing devices, and may employ any of a number of well known computer operating systems, including, but by no means limited to, known versions and/or varieties of the Microsoft Windows® operating system, the Unix operating system, and the Linux operating system.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary processing subsystem 110 is shown in FIG. 3, the exemplary components illustrated in FIG. 3 are not intended to be limiting. Indeed, additional or alternative components and/or implementations may be used. Various components of the processing subsystem 110 will now be described in additional detail.

1. Communication Interfaces

As shown in FIG. 3, the processing subsystem 110 may include a communication interface unit 131 configured to receive media content from the media content provider 111. The processing subsystem 110 may also include a receiver 132 configured to receive input commands from a user input device 113. The user input device 113 may include, for example, a remote control, keyboard, or any other suitable input device and may be configured to communicate with the receiver 132 via an IR link, electrical connection, or any other suitable communication link.

Figure 4:
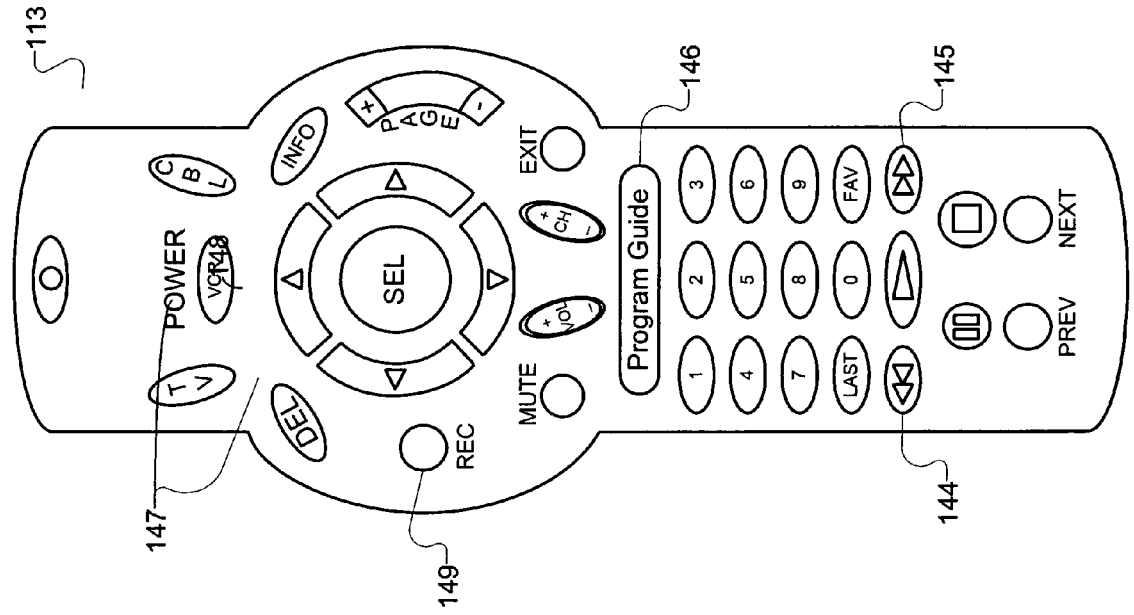
FIG. 4 illustrates an exemplary remote control user input device, according to an embodiment.

An exemplary remote control user input device 113 is illustrated in FIG. 4. It will be recognized that the input device 113 shown in FIG. 4 is merely illustrative of the many different types of user input devices that may be used in connection with the present systems and methods.

In some examples, the input device 113 may be configured to enable a user to control viewing options of the media content. For example, rewind 144 and fast-forward buttons 145 enable a user to access different scenes or frames within recorded media content. A program guide button 146 may be configured to evoke the display of a program guide by the display device 112. Arrow buttons 147 allow the user to navigate through various on-screen menus that may be displayed by the display device 112. A select button 148 allows the user to select various options that may be presented in a graphical user interface ("GUI") that is displayed by the display device 112.

A record button 149 may also be included on the input device 113. The record button 149 may be configured to enable the user to designate as permanently recorded any media content instance that is buffered in the live cache buffer 136. The record button 149 may additionally or alternatively be used to record a snippet of a media content instance, as will be described in more detail below.

Returning to FIG. 3, one or more additional access devices 114 may also be configured to communicate with the processing subsystem 110. These access devices 114 may include, but are not limited to, personal computers and mobile devices (e.g., laptops, personal digital assistants ("PDAs"), cellular phones, etc.). In some examples, as will be described in more detail below, the access devices 114 may be configured to access content stored and/or processed by the processing subsystem 110. For example, media content that has been recorded by the processing subsystem 110 may be accessed and viewed on a personal computer. In addition, as will be described in more detail below, a snippet of a particular media content instance may also be accessed via one or more of the additional access devices 114. It will be recognized that the additional access devices 114 may also be used to program or otherwise control the functions of the processing subsystem 110.

The processing subsystem 110 may also include an output driver 133 configured to interface with or drive the display device 112. The output driver 133 may include any combination of hardware, software, and firmware as may serve a particular application.

2. Storage Devices

Storage device 134 may include one or more data storage media, devices, or configurations and may employ any type, form, and combination of storage media. For example, the storage device 134 may include, but is not limited to, a hard drive, network drive, flash drive, magnetic disc, optical disc, or other non-volatile storage unit. As will be described in more detail below, various portions of media content may be temporarily and/or permanently stored in the storage device 134.

The storage device 134 of FIG. 3 is shown to be a part of the processing subsystem 110 for illustrative purposes only. It will be understood that the storage device 134 may additionally or alternatively be located external to the processing subsystem 110.

The processing subsystem may also include memory 135. Memory 135 may include, but is not limited to, FLASH memory, random access memory ("RAM"), dynamic RAM ("DRAM"), or a combination thereof. In some examples, as will be described in more detail below, various applications (e.g., a PVR application) used by the processing subsystem 110 may reside in memory 135.

As shown in FIG. 3, the storage device 134 may include one or more live cache buffers 136. The live cache buffer 136 may additionally or alternatively reside in memory 135 or in a storage device external to the processing subsystem 110. As will be described in more detail below, media content data may be temporarily stored in the live cache buffer 136 to facilitate viewing of the media content in one or more trick play modes.

3. Tuner

Tuner 137 is configured to tune to a particular television channel, stream, address, frequency or other carrier in order to process media content that is transmitted on that carrier. In some examples, the tuner 137 may include multiple tuners such that multiple carriers of media content may be processed and/or shown on a display device 112. For example, the tuner 137 may include a first tuner configured to receive an analog video signal corresponding to a first media content instance and a second tuner configured to simultaneously receive a digital compressed stream corresponding to a second media content instance. It will be recognized that the tuner 137 may have any number of tuners configured to receive any kind of media content.

In some examples, media content received at the tuner 137 is temporarily buffered, or stored, in the live cache buffer 136. If there are multiple tuners 137, there may be a live cache buffer 136 corresponding to each of the tuners 137. Once media content is temporarily stored in the live cache buffer 136, the user may then designate whether the media content is to be permanently stored as a permanent recording in the storage device 134 or whether it is to be deleted. As used herein, the term "permanent recording" will be understood to mean media content that is stored for an extended period of time as decided by the user.

It will be recognized that in some alternative examples, media content is delivered to the processing subsystem 110 via an internet protocol ("IP") backchannel.

4. Processors

As shown in FIG. 3, the processing subsystem 110 may include one or more processors, such as processor 138 configured to control the operations of the processing subsystem 110. The processing subsystem 110 may also include a signal processing unit 139 configured to process incoming media content. The signal processing unit 139 may be configured, for example, to demodulate and parse encoded digital media content. In some examples, the processing subsystem 110 may include one or more signal processing units 139 corresponding to each of the tuners 137.

The processing subsystem 110 may also include a graphics engine 140 configured to generate graphics that are to be displayed by the display device 112. The graphics may include GUIs such as, but not limited to, a program guide, a progress bar, and other graphics.

5. Application Clients

Returning to FIG. 3, one or more applications 141-143 residing within the processing subsystem 110 may be executed upon initiation by a user of the processing subsystem 110. The applications 141-143, or application clients, may reside in memory 135 or in any other area of the processing subsystem 110 and be executed by the processor 138.

As shown in FIG. 3, one of the applications may be a program guide application 141 configured to generate a program guide that is displayed on the display device 112. An exemplary program guide includes a GUI that performs various functions including allowing a user to select and view program information associated with various media content instances.

The processing subsystem 110 may also include a personal video recording ("PVR") application 142. A PVR application is also referred to as a digital video recording ("DVR") application. As used herein and in the appended claims, unless otherwise specifically denoted, the term "PVR application" will be used to refer to any application or device configured to record media content and/or provide for the viewing of media content in trick play mode. As previously mentioned, trick play modes include, but are not limited to, slow motion, fast motion, reverse play, fast forward play, instant replay, jumping, pausing of live broadcast, and scanning. The PVR application 142 may also provide for media content recording functionality by enabling the temporary and/or permanent recording of media content to the storage device 134.

In some examples, the PVR application 142 may be integrated into the processing subsystem 110, as shown in FIG. 3, or it may be a stand-alone unit. A stand-alone PVR may be coupled to the processing subsystem 110 or it may be used in place of the processing subsystem 110. In the examples contained herein, it will be assumed that the PVR application 142 is integrated into the processing subsystem 110 for illustrative purposes only.

Figure 5:
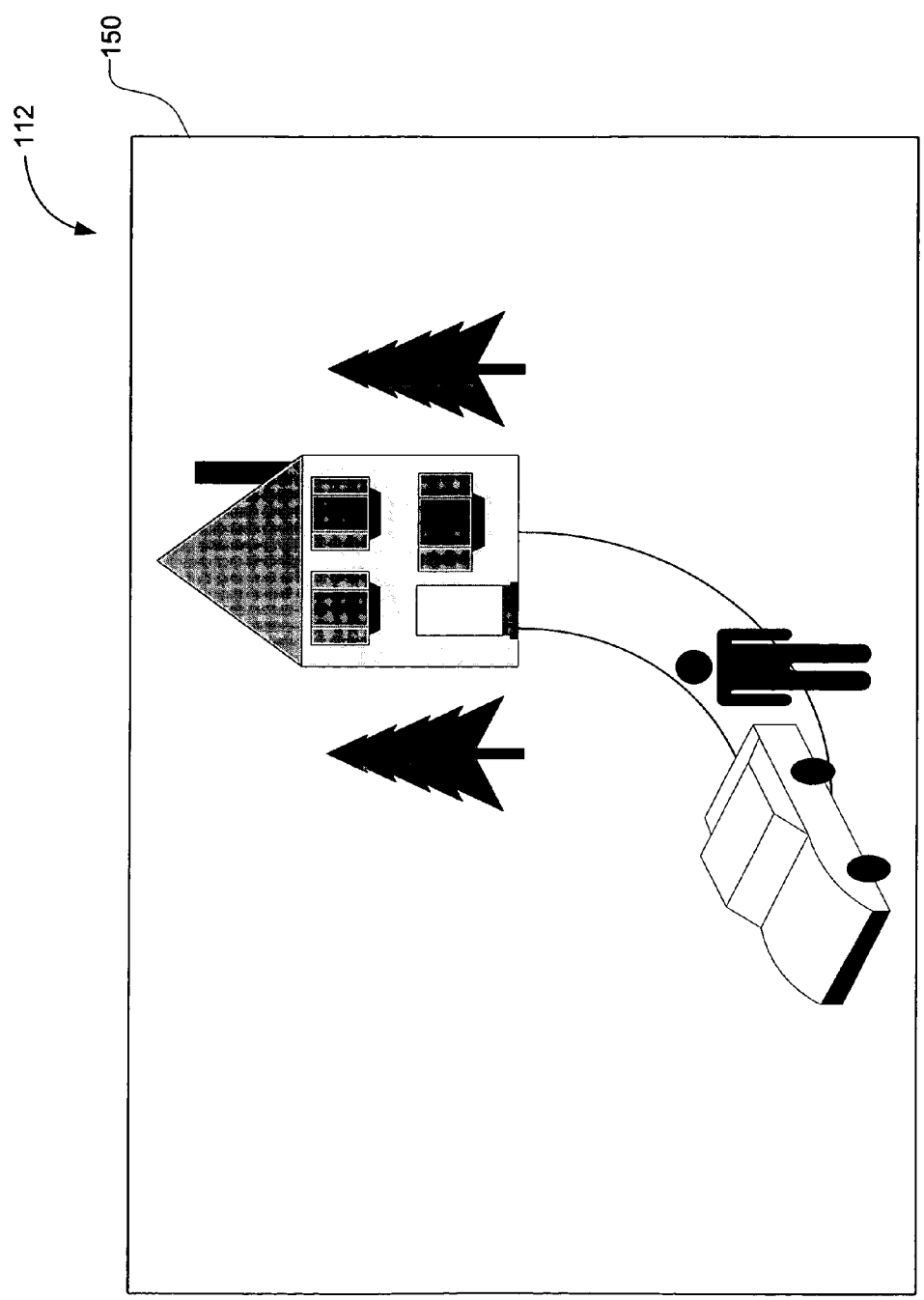
FIG. 5 illustrates a viewing screen of an exemplary display device with a particular scene or frame of a media content instance displayed thereon, according to an embodiment.

The processing subsystem 110 may also include a snippet application 143, which may be used by a user to record and/or otherwise process a snippet of a particular media content instance. To facilitate an understanding of the snippet application 143, an exemplary scene or frame of media content is shown in FIG. 5. FIG. 5 illustrates a viewing screen 150 of an exemplary display device 112 with a particular scene or frame of a media content instance displayed thereon.

In some instances, a user may desire to record a snippet of a particular media content instance such as the media content instance being displayed by the display device 112. The user may then perform a variety of functions with the snippet. For example, the user may save the snippet to the storage device 134 or to some other storage medium so as to be able to view the snippet at a later time. The snippet may additionally or alternatively be used to access additional content associated with the snippet and/or the media content instance of which the snippet is a part. In certain embodiments, as will be described in more detail below, the user may additionally or alternatively share the snippet with another user.

Accordingly, in some embodiments, a user may record a snippet simply by pressing the record button 149 on the input device 113. It will be recognized that additional or alternative methods may be used to record a snippet of a media content instance.

Figure 6:
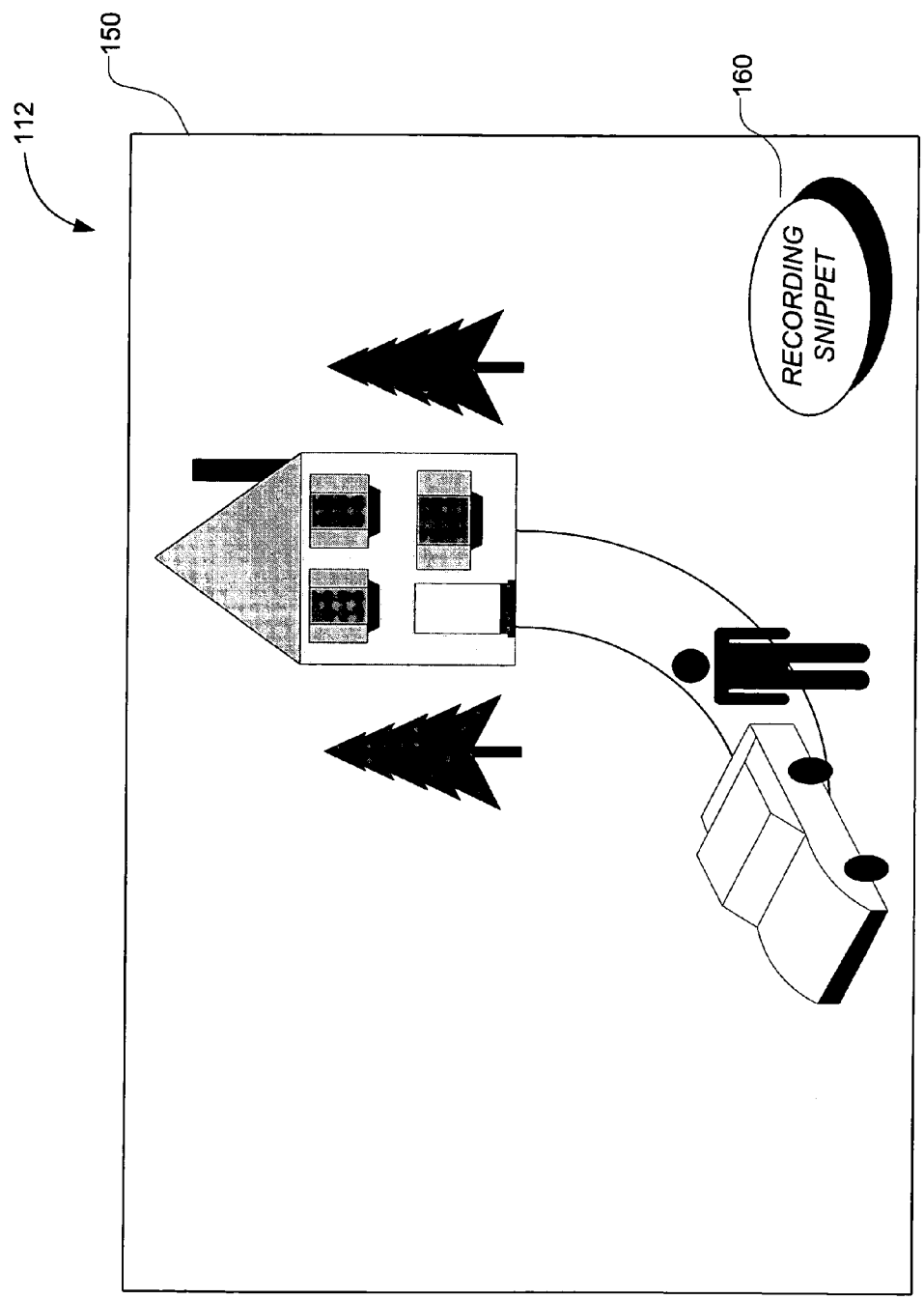
FIG. 6 shows a graphic that may be displayed by the display device to indicate that a snippet of a media content instance is being recorded, according to an embodiment.

Upon pressing the record button 149, the processing subsystem 110 may be configured to automatically begin recording the media content instance that is currently being displayed by the display device 112. In some examples, as shown in FIG. 6, a graphic 160 may be displayed by the display device 112 to indicate that the snippet is being recorded. The user may then press the record button 149 again to stop recording the snippet. The recorded snippet may then be stored in the storage device 134 or in some other storage medium as specified by the user.

Alternatively, a snippet may be recorded or captured from a media content instance that is already either temporarily stored in the live cache buffer 136 or permanently stored in the storage device 134. For example, FIG. 7 shows a frame 170 of a particular media content instance that is already either temporarily stored in the live cache buffer 136 or permanently stored in the storage device 134.

Figure 7:
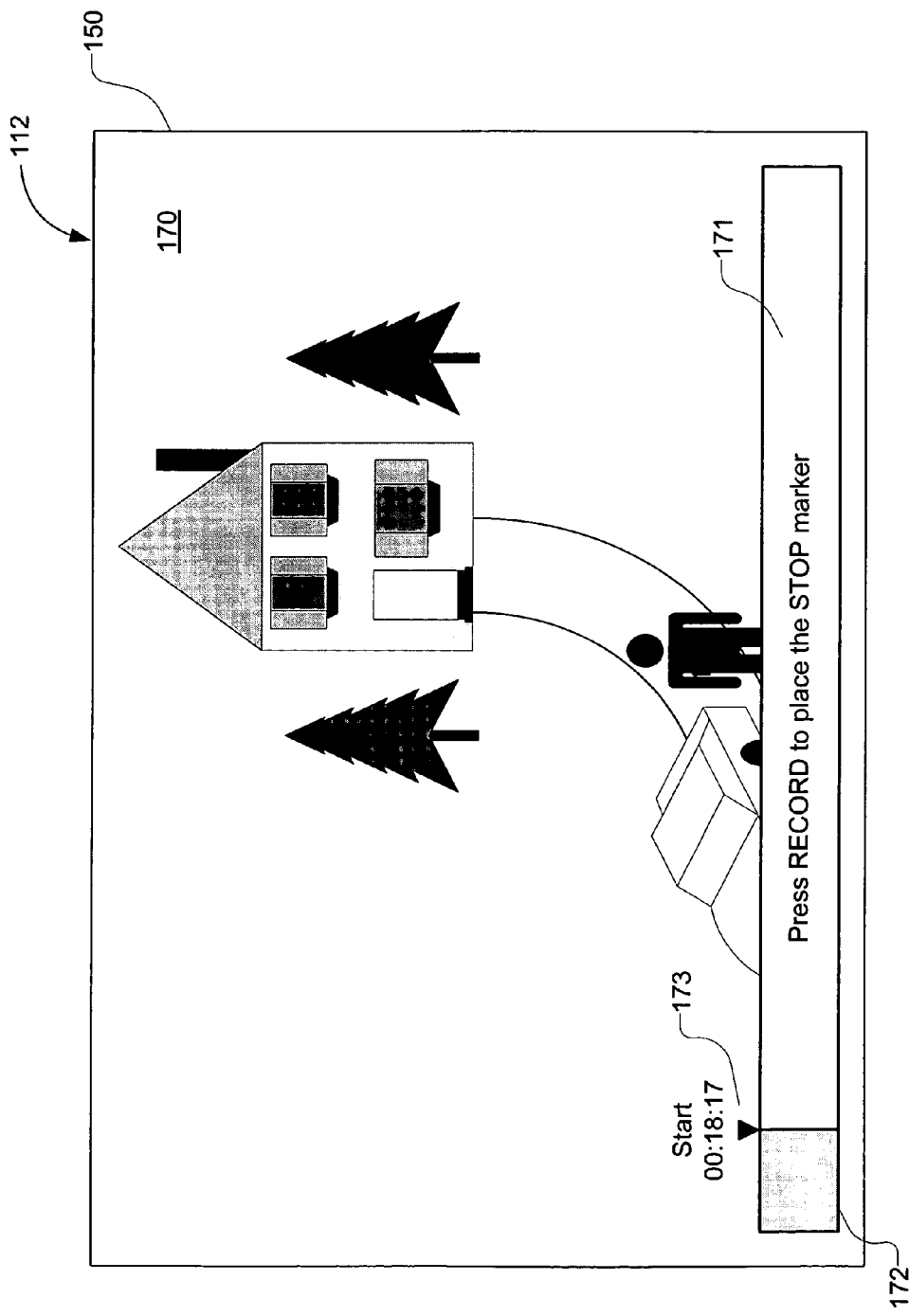
FIG. 7 shows a first marker that may be positioned along a progress bar graphical user interface (GUI) to indicate a beginning frame of a snippet of a media content instance, according to an embodiment.

As shown in FIG. 7, a progress bar GUI 171 may be displayed on the viewing screen 150. The progress bar 171 graphically represents the length of the media content instance that has been recorded and may be used by the user to navigate between different frames thereof. In some examples, the progress bar 171 may include a shaded portion 172 that graphically indicates a portion of the media content instance that has already been viewed in a particular viewing session.

Figure 8:
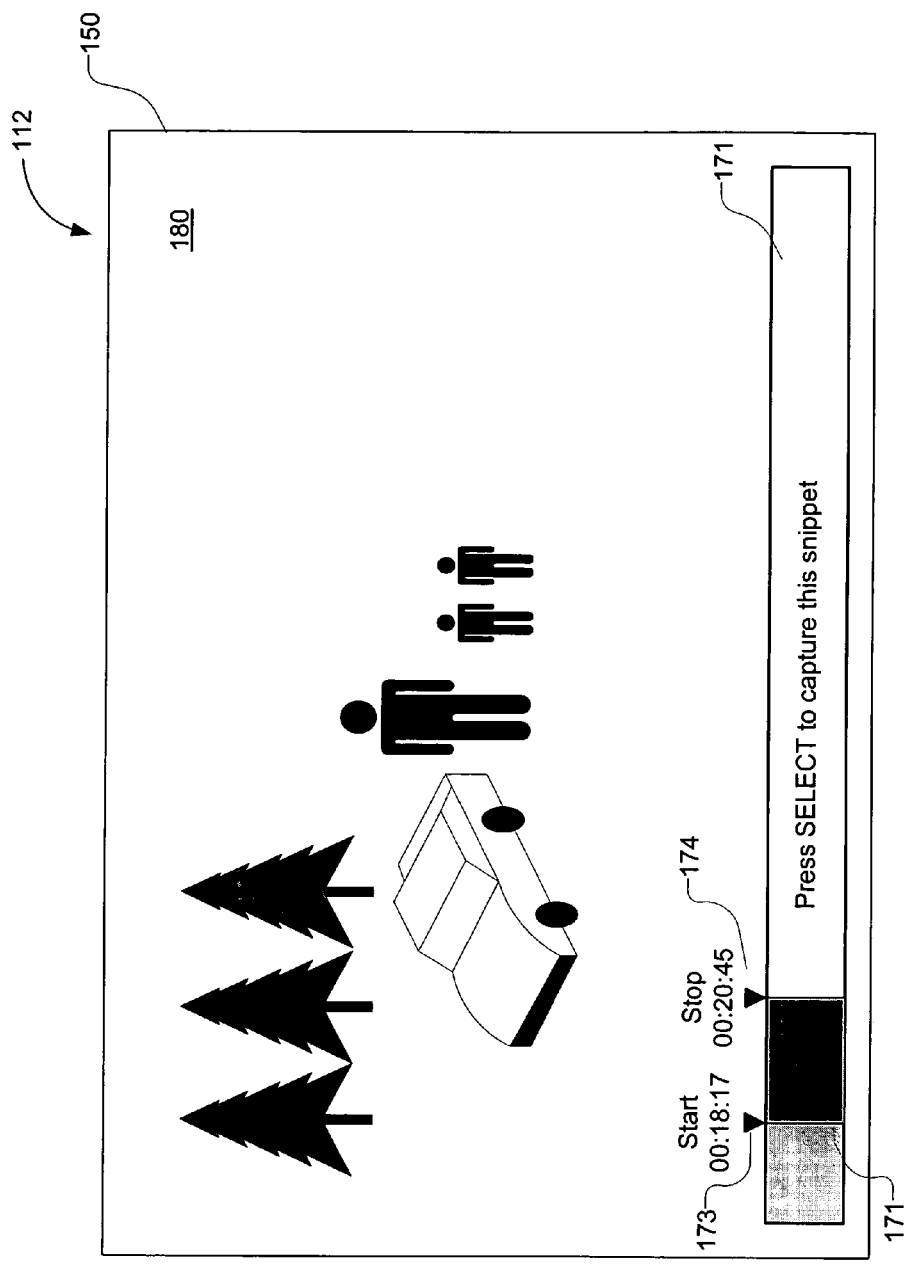
FIG. 8 shows a second marker that may be positioned along the progress bar GUI to indicate an ending frame of a snippet of a media content instance, according to an embodiment.

In certain embodiments, as shown in FIGS. 7-8, the user may record or capture a snippet from the recorded media content instance by positioning graphical markers 173 and 174 at locations along the progress bar 171 that correspond to desired beginning and ending frames of the snippet. The graphical markers 173 and 174 may have any suitable shape and size as may serve a particular application. Furthermore, the positions of the markers along the progress bar 171 may be controlled using the arrow buttons 147 or any other suitable input device.

For example, as shown in FIG. 7, if the user desires to begin recording the snippet at an elapsed time of 00:18:17 (i.e., 18 minutes and 17 seconds into the recorded media content instance), the user may position the first marker 173 at a location along the progress bar 171 that corresponds to that elapsed time. The user may then press a button on the input device 113 (e.g., the record button 149) to designate the frame 170 corresponding to the location of the first marker 173 as the beginning frame of the snippet that is to be recorded.

Likewise, as shown in FIG. 8, the second marker 174 may be positioned at a location along the progress bar 171 that corresponds to the desired ending frame 180 of the snippet. For example, as shown in FIG. 8, the user may position the second marker 174 at a location along the progress bar 171 corresponding to an elapsed time of 00:20:45 in order to record a snippet that is 2 minutes and 28 seconds long. Once the second marker 174 has been appropriately positioned, the user may press a button on the input device 113 (e.g., the select button 148) to designate the frame 180 corresponding to the location of the second marker 174 as the ending frame of the snippet. The processing subsystem 110 may then be configured to record or capture the snippet.

It will be recognized that the length in time of the snippet may vary as may serve a particular application. In certain embodiments, the length of a snippet may be limited by the media content provider 111, for example, to a predetermined amount of time (e.g., 3 minutes) so as to prevent the recording and distribution of larger segments of media content. In certain embodiments, the media content provider 111 may additionally or alternatively limit the number of snippets that may be recorded from a particular media content instance.

Figure 9:
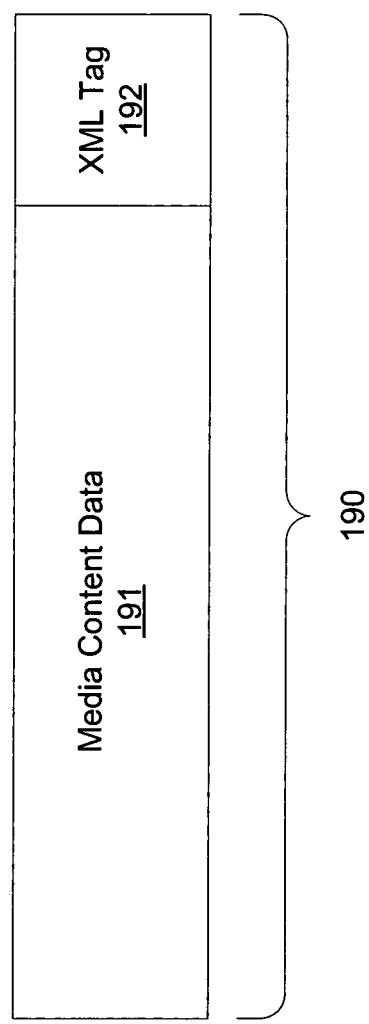
FIG. 9 is a block diagram of an exemplary snippet file, according to an embodiment.

Once a snippet has been selected, data representing the snippet may be stored by the processing subsystem 110 as one or more media files. FIG. 9 is a block diagram of an exemplary snippet file 190. As shown in FIG. 9, the snippet file 190 may include media content data 191 and an extensible markup language ("XML") tag 192. The media content data 191 includes data representing the recorded snippet of media content. The XML tag 192 may include, but is not limited to, a program identification ("ID"), time and date stamps, information regarding the cast, products, and other items shown within the snippet, marketing information, advertiser information, and/or any other information related to the snippet of media content. As will be described in more detail below, the information included within the XML tag 192 may be used by the media content provider server 121 and/or a different processing subsystem to process the snippet file 190.

The XML tag 192 may be created using any suitable programming schema. For example, the XML tag 192 may be created using Rich Site Summary ("RSS"). It will also be recognized that the XML tag 192 may alternatively be created in a programming schema other than XML.

The snippet file 190 may be stored within the storage device 134, for example, after it is created so that the snippet file 190 may be accessed at a later time by the user. Alternatively, the snippet file 190 may be stored in a portable storage medium (e.g., a flash drive or a compact disc) so that it may be transferred to and accessed by another processing subsystem 110.

D. Snippet Access Systems

Figure 10:
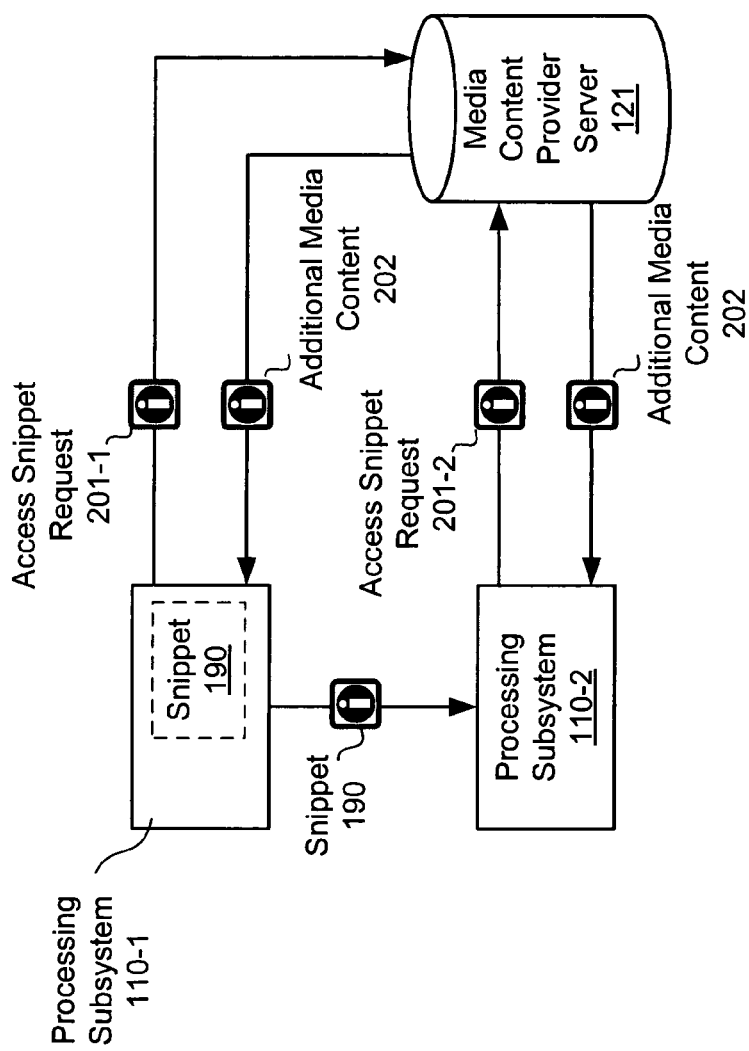
FIG. 10 illustrates an exemplary snippet access system wherein multiple processing subsystems may be configured to access a recorded snippet, according to an embodiment.

After the snippet file 190 has been stored, the user may access the snippet 190 at a later time and/or share the snippet 190 with another user. FIG. 10 illustrates an exemplary snippet access system wherein multiple processing subsystems 110 may be configured to access a recorded snippet 190, according to an embodiment. Two processing subsystems 110, 110-1 and 110-2, are shown in FIG. 10 for illustrative purposes only. It will be recognized that any number of processing subsystems 110 may be configured to access the recorded snippet 190.

Each processing subsystem 110-1 and 110-2 shown in FIG. 10 may be a part of a peer-to-peer or other type of file sharing network. However, it will be recognized that the processing subsystems 110 may be a part of any type of network as may serve a particular application.

In certain embodiments, each processing subsystem 110 may be required to send data representative of an access request (e.g., 201-1 or 201-2, collectively referred to herein as 201) to the media content provider server 121 in order to access the recorded snippet 190. It will be recognized that in certain alternative embodiments, one or more of the processing subsystems 110 may not be required to send an access request 201 to the media content provider server 121 in order to access the recorded snippet 190. It will also be recognized that the access request 201 may be sent to any other network entity configured to control access to the snippet 190.

In response to the access request 201, the media content provider server 121 may transmit to the requesting processing subsystem 110 additional media content 202 that is to be added to or included within the snippet 190 before the snippet 190 is viewed or otherwise accessed. Additionally or alternatively, the media content provider server 121 may transmit to the requesting processing subsystem 110 a decryption key or some other access code that may be used to decrypt or otherwise access the snippet 190. In this manner, the media content provider may control and, in many instances, profit from users accessing and distributing media content snippets. Moreover, such distribution among users may serve to virally spread awareness of a particular media content instance and may result in an increased number of viewers for a particular media content instance.

In some examples, the additional media content 202 that is added to the snippet 190 may be selected by the media content provider server 121 in accordance with data located within the XML tag 192. For example, if the XML tag 192 indicates that the snippet 190 corresponds to a particular television program, the media content provider server 121 may select a promotion for the television program, an advertisement targeting typical viewers of the television program, and/or any other media content instance that is related to the television program to serve as the additional media content 202 that is added to the snippet 190.

Additionally or alternatively, the additional media content 202 may be selected by the media content provider server 121 in accordance with one or more viewing preferences corresponding to the particular user who requests access to the snippet 190. The viewing preferences may be derived from a number of different sources including, but not limited to, information located within the XML tag 192 and/or user logs maintained by the media content provider server 121. In some embodiments, the user may select an option that prevents the media content provider server 121 from obtaining such viewing preferences.

To further illustrate the snippet access system of FIG. 10, a number of examples of accessing a snippet 190 will now be given. In some examples, as shown in FIG. 10, a first processing subsystem 110-1 may be configured to record and store a snippet 190 within a storage device located thereon. When a user of processing subsystem 110-1 desires to view or otherwise access the snippet 190, the processing subsystem 110-1 may transmit data representative of an access request 201-1 to the media content provider server 121. In response, the media content provider server 121 may transmit additional media content 202 to the processing subsystem 110-1 that is to be included within the snippet 190. In some examples, the additional media content 202 is selected in accordance with the XML tag 192 corresponding to the snippet 190. After the snippet file 190 has been augmented with the additional media content 202, the user may view or otherwise access the snippet 190.

Alternatively, the user of the first processing subsystem 110-1 may desire to share the snippet 190 with a user of a second different processing subsystem 110-2. To this end, processing subsystem 110-1 may be configured to transmit the snippet file 190 to processing subsystem 110-2. The transmission may occur via a network, for example, network 120. Alternatively, the snippet file 190 may be transferred to the processing subsystem 110-2 using a portable storage medium (e.g., a flash drive or a compact disc).

Once the snippet file 190 has been transferred to the processing subsystem 110-2, processing subsystem 110-2 may transmit data representative of an access request 201-2 to the media content provider server 121. In response, the media content provider server 121 may transmit additional media content 202 to the processing subsystem 110-2 that is to be included within the snippet 190. After the snippet file 190 has been augmented with the additional media content 202, the user of processing subsystem 110-2 may view or otherwise access the augmented snippet.

In certain embodiments, the additional media content 202 that is added to the snippet 190 may be user specific. In other words, a user accessing the snippet 190 via processing subsystem 110-1 may be presented with different additional media content 202 than a user accessing the snippet 190 via processing subsystem 110-2. In this manner, the media content provider server 121 may be configured to specifically target the interests and/or preferences of each user with the additional media content 202 that is added to the snippet 190.

Figure 11:
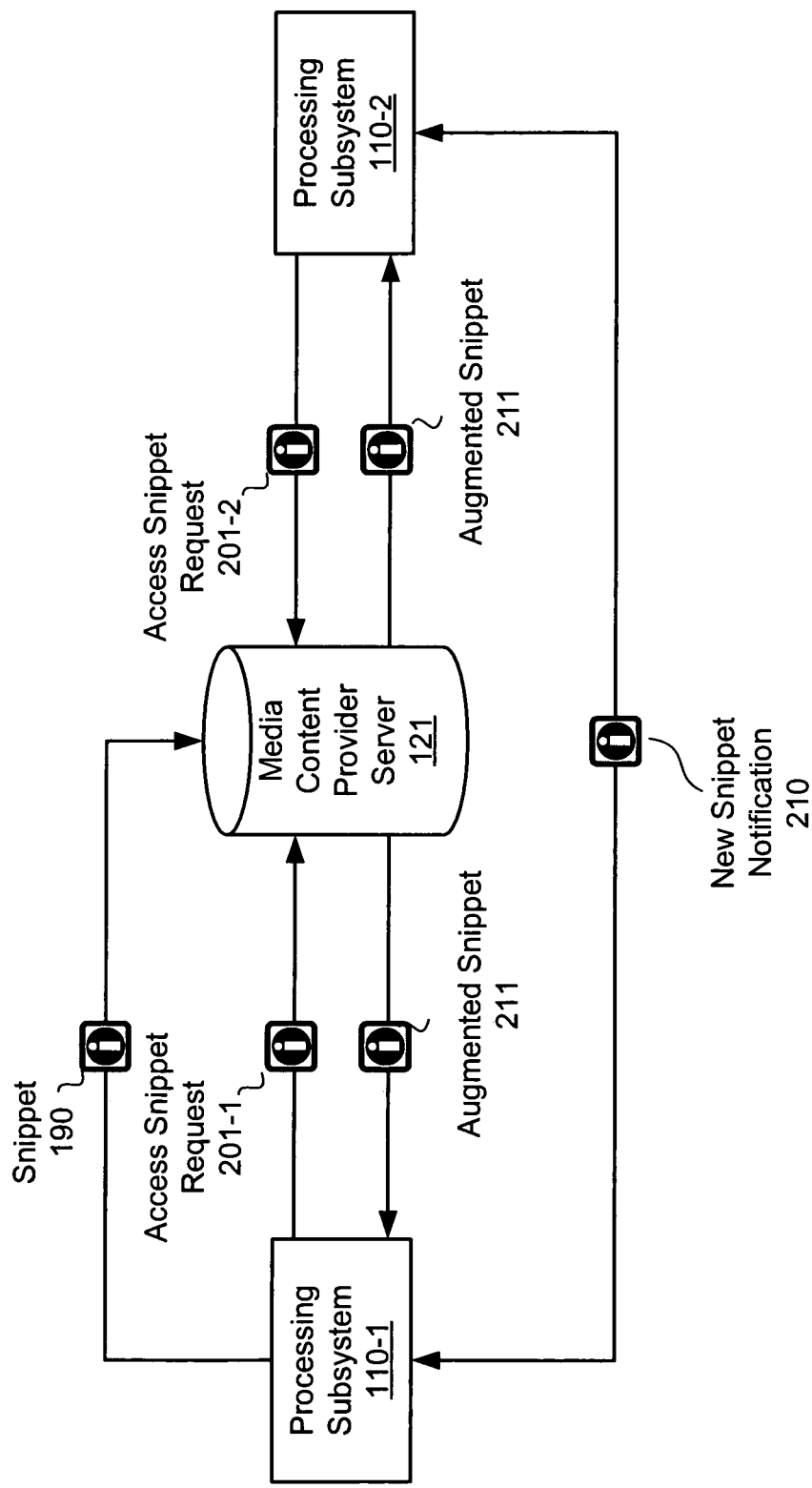
FIG. 11 illustrates an alternative exemplary snippet access system wherein multiple processing subsystems may be configured to access a recorded snippet, according to an embodiment.

FIG. 11 illustrates an alternative snippet access system, according to an embodiment. In the system of FIG. 11, once a snippet 190 has been recorded by a processing subsystem (e.g., processing subsystem 110-1), the snippet 190 is uploaded to the media content provider server 121. Each processing subsystem 110 may then be required to send data representative of an access request 201 to the media content provider server 121 in order to access the recorded snippet 190.

In response to the access request 201, the media content provider server 121 selects additional media content to be included within the snippet 190 and generates an augmented snippet 211. The augmented snippet 211 includes the data contained within the snippet file 190 and the additional content selected by the provider server 121. The media content provider server 121 then transmits the augmented snippet 211 to the requesting processing subsystem 110. The user of the requesting processing subsystem 110 may then access the augmented snippet 211.

The snippet access system of FIG. 11 may also facilitate the sharing of recorded snippets among various processing subsystems 110. For example, the user of processing subsystem 110-1 may desire to share a recorded snippet 190 with a user of a different processing subsystem 110-2. To this end, the processing subsystem 110-1 may be configured to transmit data representing a "new snippet notification" 210 to processing subsystem 110-2. Based on the new snippet notification 210, processing subsystem 110-2 may transmit data representative of an access request 201-2 to the media content provider server 121 in order to access the recorded snippet 190.

In response, the media content provider server 121 selects additional media content to be included within the snippet 190 and generates an augmented snippet 211. The media content provider server 121 may then transmit the augmented snippet 211 to the processing subsystem 110-2. The user of processing subsystem 110-2 may then access the augmented snippet 211.

While exemplary snippet access systems are shown in FIGS. 10-11, it will be recognized that the exemplary components and configurations illustrated in FIGS. 10-11 are not intended to be limiting. Indeed, additional or alternative components, configurations, and/or implementations may be used. For example, in some embodiments, one or more of the additional access devices 114 (e.g., a personal computer) may be included within the snippet access systems of FIGS. 10-11 and configured to access one or more of the recorded snippets.

Moreover, it will be recognized that the snippet access systems of FIGS. 10-11 may include any computer hardware and/or instructions (e.g., software programs), or combinations of software and hardware, configured to perform the processes described herein. Accordingly, the snippet access systems of FIGS. 10-11 may include any one of a number of well known computing devices, and may employ any of a number of well known computer operating systems, including, but by no means limited to, known versions and/or varieties of the Microsoft Windows® operating system, the Unix operating system, and the Linux operating system.

Figure 12:
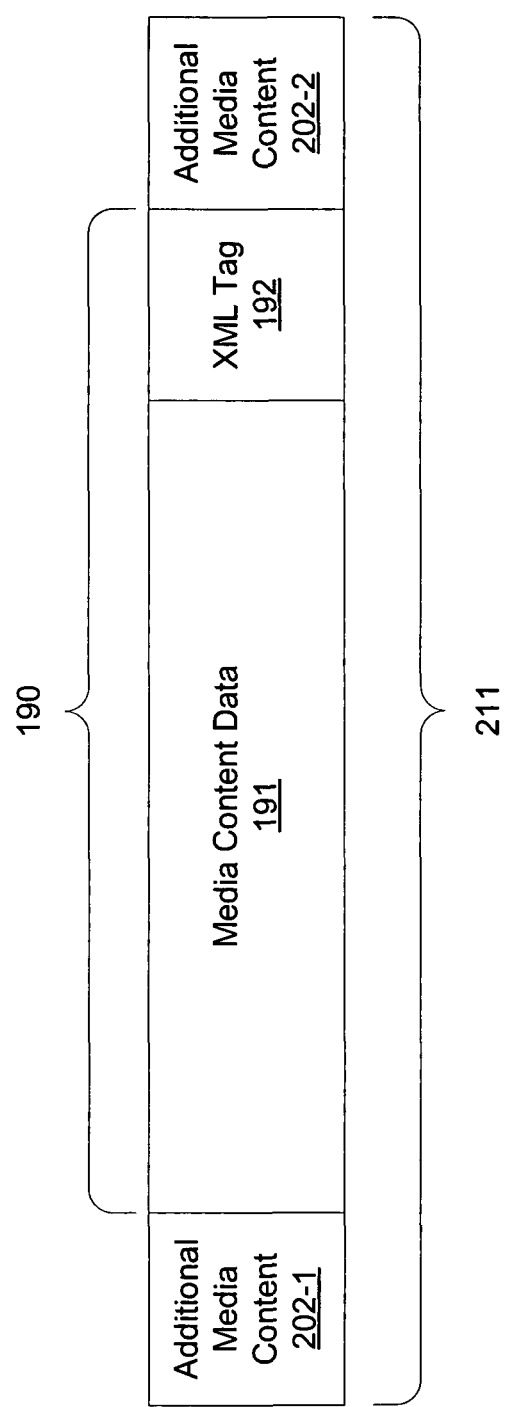
FIG. 12 illustrates an exemplary snippet file with additional media content contained therein that has been added by the media content provider server, according to an embodiment.

FIG. 12 illustrates an augmented snippet 211 with additional media content 202 contained therein that has been added by the media content provider server 121. The additional media content 202 may be located at any position within the augmented snippet 211.

For example, as shown in FIG. 12, additional media content 202-1 may be added at the beginning of the snippet 190 so that the additional media content 202-1 may be viewed prior to the media content represented by the media content data 191 being viewed. For example, an advertisement for an upcoming television program may be appended to the beginning of the snippet 190 so that the promotion may be viewed before the portion of the snippet 190 represented by the media content data 191 is viewed.

Additionally or alternatively, as shown in FIG. 12, additional media content 202-2 may be added at the end of the snippet 190 so that the additional media content 202-2 may be viewed after the media content represented by the media content data 191 is viewed. It will be recognized that the additional media content 202 may additionally or alternatively be inserted at any other location within the snippet file 190.

In certain embodiments, the additional media content 202 may be changed by the media content provider server 121 from time to time so that the user may be exposed to different instances of additional media content 202 each time the snippet 190 is accessed. For example, the additional media content 202 may include a different advertisement each time the snippet 190 is accessed by the user.

E. Snippet Access GUIs

In certain embodiments, the processing subsystem 110 may be configured to generate one or more GUIs that are configured to provide a user with access to one or more recorded snippets 190. For example, FIG. 13 illustrates an exemplary GUI 230 that may be displayed to provide a user with access to a number of snippets 231 that that user has recorded. It will be recognized that the GUI 230 of FIG. 13 is merely illustrative of the many different types and layouts of GUIs that may be used to provide a user with access to one or more snippets.

As shown in FIG. 13, the GUI 230 may be configured to display information corresponding to each of the recorded snippets 231. For example, the GUI 230 may be configured to display the titles of media content instances associated with one or more of the snippets 231, the date of recording of one or more of the snippets 231, the length in time of one or more of the snippets 231, and a number of options corresponding to of one or more of the snippets 231. For example, the GUI 230 shows that a snippet was recorded from the television program "COPS" on August 23 and that the length of the snippet is 1 minute and 27 seconds. The GUI 230 shows similar information for a number of additional snippets that have been recorded by the user.

It will be recognized that the length in time of each of the snippets may vary as may serve a particular media content instance. For example, a media content instance creator may specify a maximum length of a snippet of that particular media content instance (e.g., 3 minutes or less). Moreover, the media content provider server 121 may limit the maximum length of any snippet that is recorded and/or shared to comply with digital rights management specifications and/or available network bandwidth. The maximum length may vary as may serve a particular application.

FIG. 13 shows that the user may be presented with a number of options corresponding to each of the recorded snippets 231. The options include, but are not limited to, an option to view of one or more of the recorded snippets 231, an option to share one or more of the recorded snippets 231 with another user, and an option to delete one or more of the recorded snippets 231. Additional GUIs may be displayed to assist the user in performing one or more of the available options.

FIG. 14 shows an exemplary GUI 240 that may be configured to provide a user with access to one or more snippets 241 that have been received from another user. The GUI 240 may be configured to display pertinent information corresponding to one or more of the received snippets 241 such as, but not limited to, the title of a media content instance associated with one or more of the received snippets 241, the date on which one or more of the snippets 241 was received, the length in time of one or more of the received snippets 241, an identifier (e.g., a name or email address) of the sender of one or more of the received snippets 241, and a number of options corresponding to of one or more of the received snippets 241.

The options corresponding to each recorded snippet shown in FIG. 14 may include, but are not limited to, an option to view of one or more of the received snippets 241, an option to record of one or more of the received snippets 241 and/or one or more media content instances related thereto, and an option to delete of one or more of the received snippets 241. For example, user may select the "record" button corresponding to the media content instance entitled "House" to record one or more episodes thereof. Additional GUIs may be displayed to assist the user in performing one or more of the available options.

III. Exemplary Process View

Figure 15:
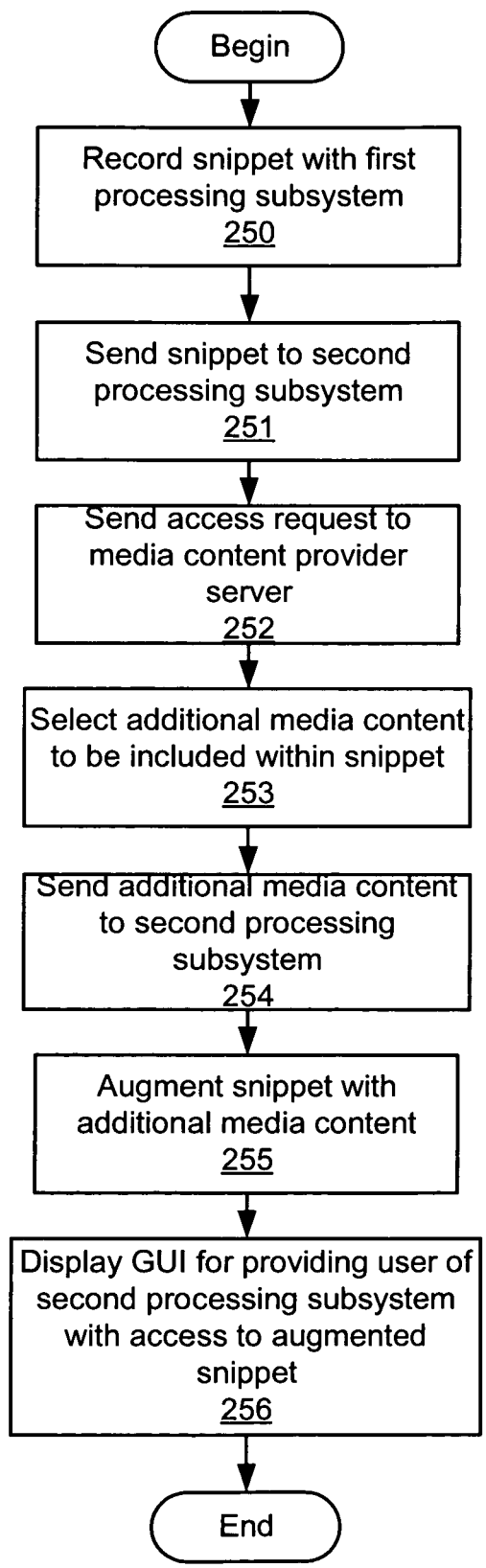
FIG. 15 illustrates an exemplary method of sharing a snippet of a media content instance between multiple processing subsystems, according to an embodiment.

FIG. 15 illustrates an exemplary method of sharing a snippet of a media content instance between multiple processing subsystems 110, according to an embodiment. While FIG. 15 illustrates exemplary steps according to one embodiment, other embodiments may omit, add to, reorder, and/or modify any of the steps shown in FIG. 15.

In step 250, a snippet 190 of a media content instance is recorded by a first processing subsystem 110-1 at the request of a user. The request to record the snippet 190 may originate from any suitable input device 113. Alternatively, the request may originate from one or more of the additional access devices 114.

In step 251, the snippet 190 is sent from the first processing subsystem 110-1 to the second processing subsystem 110-2. The snippet may be sent to the second processing subsystem 110-2 via a peer-to-peer network, for example.

A user of the second processing subsystem 110-2 may then send a request to access the snippet 190 to the media content provider server 121, as shown in step 252. In response, the media content provider server 121 selects additional media content to be included within the snippet, as shown in step 253. The selection of additional media content may be based on an XML tag 191 corresponding to the sent snippet 190, one or more user preferences, and/or any other criteria.

In step 254, the additional media content is sent from the media content provider server 121 to the second processing subsystem 110-2 to augment the snippet 190. The snippet 190 is then augmented with the additional media content, as shown in step 255. The augmented snippet 211 may then be viewed or otherwise accessed by the user of the second processing subsystem 110-2.

In step 256, one or more GUIs may be displayed by display device 112 to provide the user of the second processing subsystem 110-2 with access to the augmented snippet 211. The user may use the GUIs to browse through a number of available snippets and access one or more of the snippets.

It will be recognized that the user of the first processing subsystem 110-1 may additionally or alternatively access the recorded snippet. To this end, one or more of the steps illustrated in FIG. 15 may additionally or alternatively be used by a user of the first processing subsystem 110-1 to access the snippet.

Figure 16:
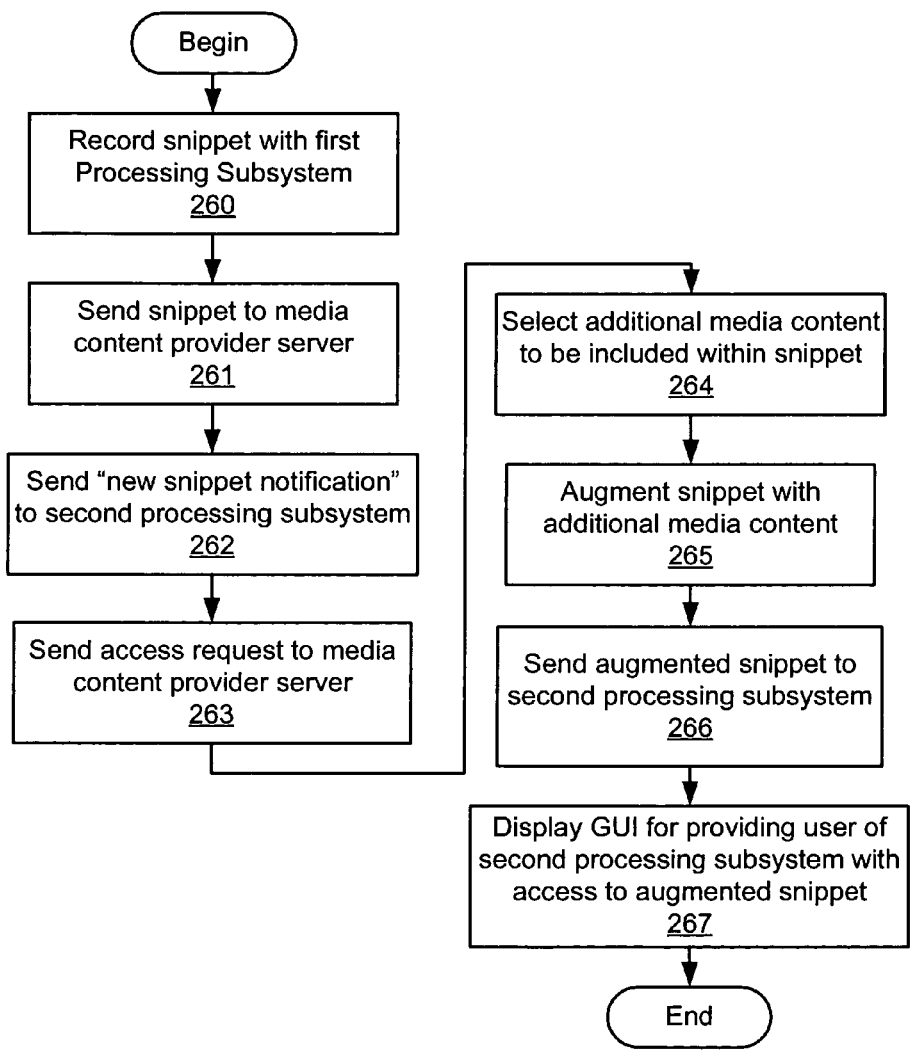
FIG. 16 illustrates an alternative exemplary method of sharing a snippet of a media content instance between multiple processing subsystems, according to an embodiment.

FIG. 16 illustrates an alternative method of sharing a snippet 190 of a media content instance between multiple processing subsystems 110, according to an embodiment. While FIG. 16 illustrates exemplary steps according to one embodiment, other embodiments may omit, add to, reorder, and/or modify any of the steps shown in FIG. 16.

In step 260, a snippet of a media content instance is recorded by a first processing subsystem 110-1 at the request of a user. The request to record the snippet may originate from any suitable input device 113. Alternatively, the request may originate from one or more of the additional access devices 114.

In step 261, the snippet 190 is sent or uploaded to the media content provider server 121. A "new snippet notification" may also be sent from the first processing subsystem 110-1 to the second processing subsystem 110-2, as shown in step 262. The new snippet notification is configured to notify a user of the second processing subsystem 110-2 that the snippet 190 has been uploaded to the media content provider server 121.

The user of the second processing subsystem 110-2 may then send a request to access the snippet to the media content provider server 121, as shown in step 263. In response, the media content provider server 121 selects additional media content to be included within the snippet 190, as shown in step 264. The selection of additional media content may be based on an XML tag 191 corresponding to the snippet 190, one or more user preferences, and/or any other criteria.

The snippet 190 is then augmented with the selected additional media content, as shown in step 265. In step 266, the augmented snippet 211 is sent from the media content provider server 121 to the second processing subsystem 110-2. The augmented snippet 211 may then be viewed or otherwise accessed by the user of the second processing subsystem 110-2.

In step 267, one or more GUIs may be displayed by the display device 112 to provide the user of the second processing subsystem 110-2 with access to the augmented snippet 211. The user may use the GUIs to browse through a number of received snippets and access one or more of the received snippets.

IV. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. It is intended that the scope of the invention be defined by the following claims.

What is claimed is:

1. A system comprising:
a network entity;
a first media content processing subsystem communicatively coupled to said network entity and configured to
receive media content from said network entity,
record a snippet of said received media content in response to a request from a user,
and
share said snippet with another media content processing subsystem,
wherein said network entity is configured to
select additional media content based at least in part on a user log maintained separately from said snippet and that indicates a user preference corresponding to said snippet and
augment, based on the user preference, first and second portions of said snippet with said additional media content that can be experienced by a user; and
a second media content processing subsystem configured to
receive said augmented snippet, and
provide said snippet and said additional media content to a user.

2. The system of claim 1, wherein said first media content processing subsystem is further configured to request access to a snippet of a media content instance from said network entity, wherein said snippet requested by said first media content processing subsystem was recorded by said second media content processing subsystem.

3. The system of claim 1, wherein said first media content processing subsystem is further configured to generate one or more graphical user interfaces that are configured to facilitate said recording of said snippet.

4. The system of claim 1, wherein said first media content processing subsystem is further configured to upload said snippet to said network entity such that said snippet is stored at said network entity.

5. The system of claim 1, wherein said second media content processing subsystem is further configured to record a snippet of media content and transmit said snippet recorded by said second media content processing subsystem to said first media content processing subsystem.

6. The system of claim 1, wherein said second media content processing subsystem is further configured to record a snippet of media content and upload said snippet recorded by said second media content processing subsystem to said network entity.

7. The system of claim 1, wherein said snippet comprises a data tag comprising information corresponding to said snippet.

8. The system of claim 7, wherein said network entity is configured to select said additional media content based at least in part on said information included within said data tag.

9. The system of claim 1, wherein said network entity is further configured to select said additional media content based at least in part on one or more user preferences corresponding to a user associated with the second media content processing subsystem.

10. The system of claim 1, wherein said first media content processing subsystem is further configured to generate one or more graphical user interfaces that are configured to facilitate requesting access to said snippet.

11. The system of claim 1, wherein said first media content processing subsystem is further configured to generate a recorded snippet listing and a received snippet listing in one or more graphical user interfaces that are configured to provide a user of said first media content processing subsystem with access to said augmented snippet.

12. The system of claim 1, wherein said additional media content comprises at least one of an advertisement, a commercial, a promotion, a screen shot, and a listing of credits.

13. The system of claim 1, further comprising:
one or more access devices configured to communicate with said network entity;
wherein said access devices are configured to access said augmented snippet.

14. An apparatus comprising:
a receiver configured to receive a request from a user to record a snippet of a media content instance;
a communication interface unit configured to transmit data representative of said snippet to a network entity and receive additional media content selected by said network entity based at least in part on a user log maintained separately from said snippet and indicating a user preference corresponding to said snippet; and
a processor communicatively coupled to said receiver and said communication interface and configured to
augment, based on the user preference, first and second portions of said snippet with said additional media content that can be experienced by a user,
generate one or more graphical user interfaces configured to provide a user with access to said augmented snippet, and
allow a user to share said snippet with an access device.

15. The apparatus of claim 14, wherein said processor and said communication interface unit are further configured to transmit said snippet to said network entity.

16. The apparatus of claim 14, wherein the user preference associated with said snippet is stored at said network entity.

17. The apparatus of claim 14, wherein said snippet comprises a data tag comprising information corresponding to said snippet and wherein said additional media content is selected by said network entity based at least in part on said information included within said data tag.

18. The apparatus of claim 14, wherein said additional media content comprises at least one of an advertisement, a commercial, a promotion, a screen shot, and a listing of credits.

19. A method comprising:
processing a request from a user to record a snippet of a media content instance via a first access device;
transmitting said snippet to a network entity;
sharing said snippet with a second access device;
selecting additional media content based at least in part on a user log maintained separately from said snippet and that indicates a user preference corresponding to said snippet;
augmenting, based on the user preference, first and second portions of said snippet with said additional media content that can be experienced by a user;
sending a notification of said augmented snippet to said second access device; and
providing access to said augmented snippet via said second access device.

20. The method of claim 19, the selecting of said additional media content based at least in part on information located within said snippet.

21. The method of claim 19, wherein the selecting of said additional media content is based at least in part on one or more user preferences corresponding to a user associated with said second access device.

22. The method of claim 19, further comprising generating a recorded snippet listing and a received snippet listing in one or more graphical user interfaces that are configured to provide access to said augmented snippet.

23. The method of claim 19, wherein said additional media content comprises at least one of an advertisement, a commercial, a promotion, a screen shot, and a listing of credits.

24. The method of claim 19, wherein said first access device comprises at least one of a set-top box, a home communication terminal, a digital home communication terminal, a stand-alone personal video recorder, a video-enabled phone, and a personal computer.

25. The system of claim 1, wherein said network entity is further configured to:
receive an access request from said second media content processing subsystem to access said snippet, wherein said snippet is augmented with said additional media content in response to said access request; and
provide said augmented snippet including said additional media content to said second media content processing subsystem.

26. The apparatus of claim 14, wherein said additional media content is selected by said network entity based at least in part on one or more user preferences corresponding to a user associated with said second access device.

27. The method of claim 19, further comprising:
receiving an access request from said second access device to access said snippet, wherein the augmenting of said snippet with said additional media content is in response to said access request; and
providing said snippet and said additional media content to said second access device.

28. The system of claim 1, wherein said snippet includes information representing said snippet, and wherein said network entity is further configured to select said additional media content based on said information representing said snippet.

29. The system of claim 1, wherein said network entity is further configured to limit an amount of media content that can be recorded from a particular media content instance.

* * * * *